United States Patent [19]
Novakovich

[11] 3,841,098
[45] Oct. 15, 1974

[54] HIGH EFFICIENCY POLLUTANT-FREE COMBUSTION GAS GENERATOR

[76] Inventor: Milan Novakovich, 215 Apolena Ave., Balboa Island, Calif. 92662

[22] Filed: Jan. 19, 1973

[21] Appl. No.: 325,171

[52] U.S. Cl. .................................. 60/647, 60/671
[51] Int. Cl. ............................................. F01k 25/00
[58] Field of Search ............... 60/36, 108; 431/329; 122/156, 367

[56] References Cited
UNITED STATES PATENTS

| | | | |
|---|---|---|---|
| 1,904,361 | 4/1933 | Egloff et al. | 122/367 |
| 3,110,300 | 11/1963 | Brown et al. | 431/329 |
| 3,479,817 | 11/1969 | Minto | 60/36 |
| 3,698,184 | 10/1972 | Barrett | 60/36 |

FOREIGN PATENTS OR APPLICATIONS

| 239,274 | 6/1962 | Australia | 431/329 |
|---|---|---|---|

*Primary Examiner*—Edgar W. Geoghegan
*Assistant Examiner*—H. Burks, Sr.
*Attorney, Agent, or Firm*—Roman A. DiMeo

[57] ABSTRACT

This invention is for a novel high efficiency, pollutant-free gas generator comprising a cylindrical chamber having an inner wall and an outer wall in which is circulated a working fluid having a low latent heat, a low specific heat and a high specific gravity, a screen having a catalyst provided over a substantial portion of its surface is positioned in spaced relationship to said cylindrical chamber so as to provide an air gap between said catalyst and said chamber, conduit means for providing flameless combustable fuel to said catalyst whereby radiant heat is developed by combusting said fuel over said catalyst thereby superheating said working fluid above its critical temperature yet maintaining said fluid in a liquid state.

28 Claims, 5 Drawing Figures

HIGH EFFICIENCY POLLUTANT-FREE COMBUSTION GAS GENERATOR

Environment pollution and deterioration, and air pollution in particular, are important social, economic, technological, as well as political issues and problems today.

The internal combustion engine, which is almost universally used as a motor in road vehicles, as well as in a multitude of other applications, is also the main source of air pollution. The recent laws imposed to restrict air pollution by motor vehicles through modification of the engine or correlated components, tend to reduce the efficiency and the flexibility of the internal combustion engine. If those restrictions are enforced to their fullest extent, they will render the internal combustion engine impractical as motive power for motor vehicles, since emission of air polluting gasses is inherent in the basic working principle thereof.

On the other hand, the external combustion motor, i.e., the steam turbines and steam engines, while in theory provide a "clean" combustion, due to certain thermodynamical properties of water, which is used as working fluid therein, has very low thermal efficiency. Thus, in order to improve their thermal efficiency, large condensers and preheaters are required, thereby making steam motors impractical for motor vehicles.

Thus, the purpose of this invention is to provide a highly efficient gas generator for generating high pressure gases for driving turbines and other motors and as a consequence of the foregoing, a motor for motor vehicles, as well as for other applications will result, which would be free from emission of air polluting products, while concurrently improving the overall efficiency and simplifying the mechanical embodiment of the motor so as to reduce the size and weight of the same.

As will be seen from the following, overall efficiency of the proposed motor is far superior even to the most efficient stationary, constant, r.p.m. diesel engines due to the reduced requirement of fuel per H.P./hour, and especially due to the novel mode of combustion. For the same reasons, pollutant-free combustion will be achieved.

The new motor of the instant invention is based upon the following:

In its basic conception, the new motor is a Rankin cycle heat motor, consisting of a gas generator or boiler, wherein high pressure gas is generated by the application of heat to a working liquid. The high pressure gas is ducted to a turbine or a piston engine, where its kinetic energy is converted to mechanical work, i.e., to torque at the shaft.

Water (steam) which is used as working fluid in conventional motors, has a very high latent heat, as well as a high specific heat thereby requiring a high input of heat for steam generation, resulting in low efficiency. The relatively high freezing temperature of water also causes considerable problems in cold ambients. For these reasons water is impractical as working fluid in motors for vehicles, as well as for motors in many other applications.

Because of the disadvantages inherent in water as a working fluid, attempts have been made to utilize other working fluids. The desirable qualities for a working fluid for such applications are: low latent heat, low specific heat, low freezing temperature, it must be liquid at "room temperature," nonflamable, nontoxic, noncorrosive, have a high molecular weight and has to be commercially available.

These requirements are best satisfied by selected halogenated hydrocarbon compounds, and perhaps, some others with even better properties may be developed. For example, the tetrafluor-dibrom-ethan, or $CBrF_2$-$CBrF_2$, commercially known as FREON 114B2, has properties very close to the ideal for a working fluid in a Rankin cycle motor. Using FREON 114B2 as an example, its most outstanding properties are its exceptionally low latent heat and its low specific heat. Thus, to evaporate 1 kgr of FREON 114B2 at atmospheric pressure, i.e., in open air, at "room" temperature (20°C) 30 Calories are required, while to evaporate 1 kgr of water under the same conditions 620 Calories are required. Therefore, for a given quantity of heat, 20 times more FREON 114B2 will be evaporated than water.

The critical temperature of FREON 114B2 is 214.5°C while the critical pressure is 34.5 Atm. That is the limit of pressure at which a motor using FREON 114B2 as a working fluid may operate. That maximum working pressure is relatively low in comparison to pressures used in modern steam motors. Yet that pressure is adequate to efficiently operate a turbine, particularly because of the very high molecular weight of FREON 114B2. At the same temperature and pressure, 1 $m^3$ of FREON 114B2 gas has 14.5 times greater mass (consequently greater kinetic energy), that the same volume of steam. Although the relatively low working temperature affects the thermal efficiency of the system, there are certain important advantages which will hereinafter be more fully described.

In addition to the foregoing properties, the freezing temperature of FREON 114B2 is extremely low (−110°C). Consequently, there would be no problem of freezing, as encountered with water, even under most severe climatic conditions.

Since the thermodynamical and physical properties of the working fluid affect the design, material requirement, as well as the physical size of the mechanical components, the size and the weight of the whole engine are also affected.

Mechanically there are two separate basic subunits in the proposed motor; the gas generator or the boiler, and the motor in which kinetic energy of the generated gas is converted to mechanical work.

THE GAS GENERATOR

As hereinabove indicated, based on thermodynamical properties, certain halogenated hydrocarbons exhibit a marked superiority over water (steam) as a working fluid. However, the design of the gas generator will determine how much of that thermodynamical superiority will be converted to practical use, e.g., how much of the heat produced by combustion will be conveyed to the working fluid. The relatively low working temperature, low specific heat and high specific gravity of the proposed working fluid permits the design of a gas generator which is very efficient and compact.

Heretofore, all boilers (gas generators) applied the flame of combusted fuel directly to the walls of the boiler, thereby conveying heat by conduction. However, this method is a very inefficient mode of conveying heat since an excess of heated air is produced and subsequently lost through the chimney. Besides, due to difficulties in controlling the combustion in response to varying gas requirements, and due to the high temperature of combustion, some air polluting products result.

Since radiation is the most efficient mode of conveying heat, in the instant invention the fluid in the gas generator is heated by radiant heat. That is, by infrared and red rays, or heat rays. The heat rays are produced on the surface of a catalyst by the flameless combustion of the fuel. Since catalytic combustion is a highly controllable and efficient process, there is no loss of heat to the "chimney." In fact, since there are no unburned hydrocarbons nor CO gas, and the temperature of combustion is maintained below the temperature of formation of N-oxides, no air pollutants are produced and no chimney is required.

Another important advantage of infrared heating is the greatly reduced time necessary to attain the working temperature of the fluid. Since the theoretically required input of heat is very low and since the mode of conveying the heat to the fluid is the most efficient, the efficiency of the design of the gas generator becomes a major factor in overall efficiency of the system.

Although several different configurations of gas generators are possible, in order to maximize the use of the heat, the following features are necessary:

A high surface to volume ratio of the vessel, i.e., a large heating surface.

The surface of the catalyst at which combustion occurs must be commensurate to the heating surface of the vessel. The location of the catalytic burner must be such so as to exclude any loss of radiant heat, while allowing an access to the air required for combustion. Except for the heating surfaces, all other surfaces of the vessel must be insulated to prevent loss of heat.

When in operation, the fluid in the vessel by means of the injector is kept above the critical pressure while the temperature is maintained somewhat above the critical point. There is only superheated liquid, never gas in the vessel. The surpressure is kept constant by means of a sensor, mechanical or electronical, located in the vessel. The sensor activates the injector in response to variations in pressure. The capacity of the injector has to be such as to satisfy the requirement of the motor at "full throttle."

Although the generator may operate without a surpressure, such a surpressure is desired to obtain optimum results. Since gas requires a larger volume, by maintaining the fluid in liquid form, a relatively smaller generator may be utilized. Further, by maintaining the liquid slightly above the critical temperature, maximum pressure to gas ratio is assured thereby also requiring a smaller generator. Of course, by utilizing liquid only in the generator, quantities are more easily controlled than if a liquid and gas combination existed.

The temperature of the fluid in the vessel is also maintained constant by means of sensors which regulate the input of the heat to the fluid.

Thus, the operation of the gas generator is fully automatic as a function of the requirement of the motor. The "throttle" is the only one manual control, that is, the valve which regulates the output of the motor.

In order to prevent hydraulic shock in the motor, a thermostatically or electronically controlled valve prevents the release of fluid from the gas generator below the working temperatures.

THE MOTOR

Either a piston engine or a turbine can be used as a motor. However, a turbine is preferred due to its simplicity, low frictional losses, smooth running and much smaller size. Further, because of the absence of reciprocating components and the resistance of valve springs, the mechanical efficiency of a turbine is much higher than a piston engine. Also the problem of lubrication is reduced to two bearings only.

Since the mass per volume ratio of the selected working liquid is very high, the physical size of the turbine, for a given power output would be very small in comparison with a steam turbine operating at the same pressure. Also, since the working temperature and pressures are relatively low, there is no necessity for expensive heat resistant alloys, as required by the usual gas and steam turbines. Thus all turbine components may be made from light alloys, resulting in a very light unit.

Although a single stage turbine is satisfactory, due to relatively low working pressure, a multistage turbine or a turbine of some other configuration may be used without departing from the scope of the invention herein.

Due to the very low heat of condensation of the selected working fluid, i.e., less than 5 percent of the heat of condensation of steam, no condenser is necessary. Such a small quantity of the heat of condensation can be dissipated by the turbine itself and by the ducting leading to the fluid tank as well as by the fluid tank. These components could be made from light alloys too.

Since the boiling temperature of the selected working fluid is 47°C (117°F) at atmospheric pressure, only under extreme climatic conditions, after expansion, the fluid must be maintained at a small surpressure in order to maintain it in a liquified state.

In order to maintain a continuous output of the motor, the portion of the fluid which is spent in the gas generator has to be replenished in order to respond to the requirements of the motor. Therefore, an injector is necessary which has a working pressure above the working pressure in the gas generator. Such a relatively low pressure requires only a simple pump for injection, whose output may be controlled electronically in response to fluid consumption. Thus, except for the fluid injector, the system does not require any parasitic accessory.

Due to the thermodynamical properties of the working fluid, which requires an input of heat less than 9.5 percent of that required by water to attain the working pressure of 34.5 Atm., and due to the catalytic combustion and to the mode of conveying heat to the working fluid by radiation, an exceptionally high rate of conversion of generated heat to kinetic energy of the gas can be expected.

Unlike internal combustion motors, where the load on the shaft greatly affects the efficiency, the overall efficiency of the proposed motors remains unchanged over the entire operating range irrespective of load on the turbine, since that load does not affect either the efficiency of catalytic combustion nor the efficiency of radiant heating.

When compared to existing motors, the efficiency of the proposed motor is extremely high. Assuming conservatively the efficiency of the gas generator as being 80 percent, and the efficiency of the turbine as being 90 percent, an overall efficiency of 72 percent is obtained for the system. This is more than twice the efficiency of the diesels, and close to four times the efficiency of Wankel motors when working at variable loads. Further, of prime importance is the fact that this efficiency is derived from a pollution-free power source.

The efficiency of a gas generator or a boiler depends to a great extent on the method of conveying heat to the working fluid. As aforesaid, at the present all boilers or gas generators used for that purpose, apply the flame of combusted fuel directly to the walls of the boiler thereby conveying heat by conduction. However, this method is not the most efficient way of conveying heat since an excess of the heated air is produced and subsequently lost through the chimney.

Since radiation is the most efficient way of conveying heat, in the instant invention, the fluid in the gas generator is heated by radiant heat. That is, by red and infrared rays. The red and infrared rays, or heat rays, are produced on the surface of a catalyst by the flameless combustion of the fuel. Since catalytic combustion is a highly controlled process, there is no loss of heat to the "chimney."

It should be noted that although the catalytic radiant heater has hereinabove been described in conjunction with internal and external combustion motors, it may easily have other applications, such as for water heaters for home and industrial uses resulting in a reduced requirement for gas or liquid fuel.

Accordingly, the principal object of the invention is to provide a simple, highly efficient and economical gas generator which utilizes a catalytic combustion to produce radiant heat which is conveyed to the working fluid for driving turbines and piston engines.

Another object is to provide a simple, highly efficient and economical gas generator which utilizes a controlled catalystic combustion.

Yet another object is to provide a simple, highly efficient and economical gas generator which maintains a controlled pressure and temperature in the vessel and maintain a predetermined heat generation level.

Another object is to provide a method for driving motors which produces no air polluting products.

Still another object is to provide a method for driving motors which produces no air polluting products and has a high thermal efficiency.

Yet another object is to provide a highly efficient method for converting heat to mechanical work without producing air polluting products.

Other objects and advantages of the invention will become apparent from the following description taken in conjunction with the accompanying drawings, which:

Figure 1:
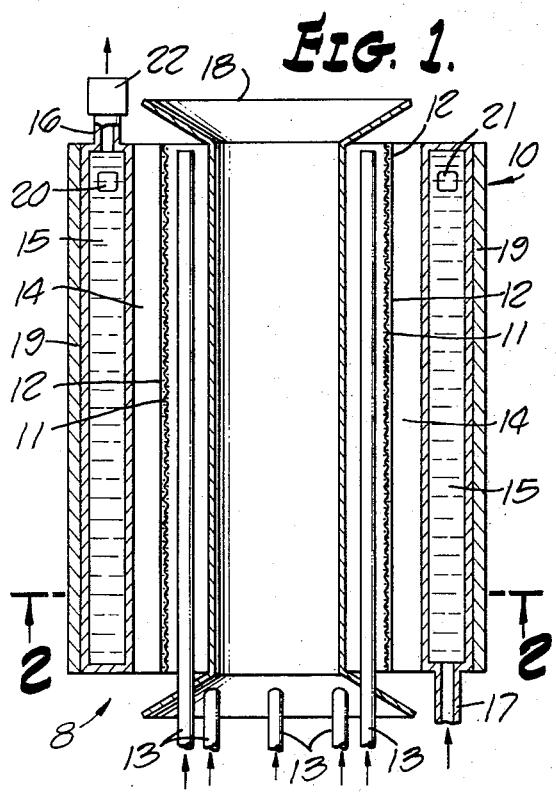
FIG. 1 is a sectioned side elevational view of the gas generator of the instant invention.
Figure 2:
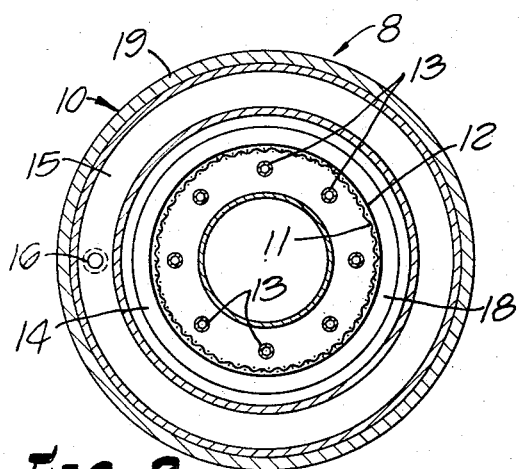
FIG. 2 is a top plan view of the gas generator of FIG. 1.

Referring more particularly to FIGS. 1 and 2 reference numeral 8 designates generally the gas generator of the invention having a body comprised of a cylindrical vessel 10 having a high surface to volume ratio provided with an internally located concentric mesh 11 serving as a support for a catalyst 12. Liquid or gas fuel is brought into inlet port 13 and spread over the surface of the catalyst 12, where when ignited, a flameless combustion occurs, resulting in radiant heat as at 14 acting on working fluid 15 in the vessel 10.

The superheated working fluid 15 is ducted out through outlet duct 16 for use as propellant in a turbine or other motor. A constant pressure is maintained in the vessel 10 by injecting fresh working fluid therein with a conventional fuel injector, (not shown) via inlet duct 17 to replace the spent working fluid. In order to maximize the use of the generated heat, a reflector 18 is provided to direct stray heat rays toward the working fluid 15, while an insulating coat 19 externally encompasses vessel 10 to prevent loss of heat.

When the gas generator is in operation, it should be noted that there is never gas inside the gas generator, only superheated liquid, at a pressure and a temperature slightly above the critical pressure and critical temperature. This pressure is maintained by conventional electronic or mechanical pressure sensors 20, located inside the gas generator, which at the drop of pressure, automatically activate the injector which replenish the spent liquid.

The temperature inside the gas generator is maintained constant and slightly above the critical temperature by means of temperature sensors 21 which regulate the input of the fuel (and concommitantly the input of the heat to the working liquid) in order to heat freshly injected fuel to the required temperature.

It is obvious that the operation of the gas generator is fully automatic and is a function of consumption of the superheated working liquid. There is only one manual control, the "throttle," i.e., the valve which regulates the output of the motor.

However, in order to prevent hydraulic shock in the motor, a thermostatically or electronically controlled valve 22 prevents release of the working liquid from the gas generator below the working temperature.

Figure 3:
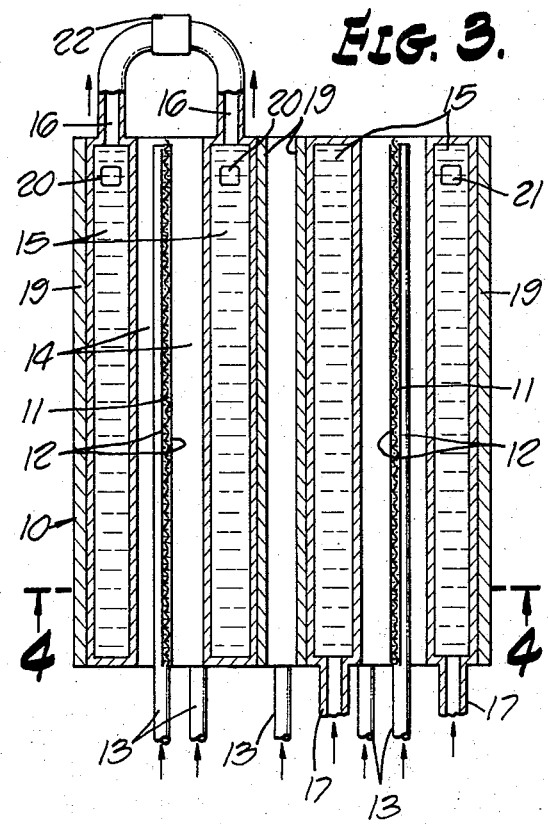
FIG. 3 is a sectioned side elevational view of an alternate embodiment of the gas generator of the instant invention.
Figure 4:
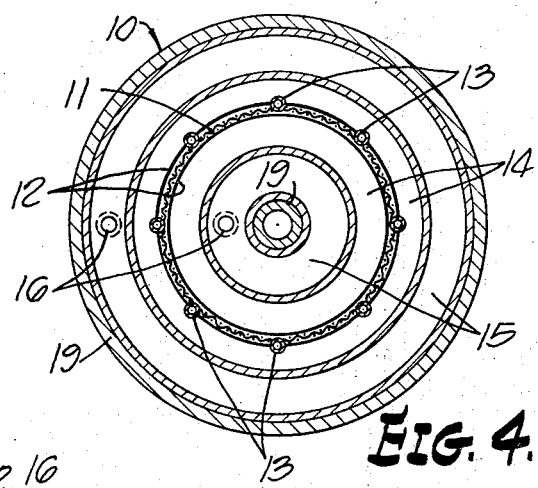
FIG. 4 is a top plan view of the gas generator of FIG. 3 taken on the line 4 — 4 thereof.

In FIGS. 3 and 4 an alternate embodiment of the gas generator of the invention is shown in which a second cylindrical vessel 23 is concentrically located within the vessel of FIG. 1 having the catalyst 12 located on both sides of the supporting mesh 11 so that the generated radiant heat is directed toward both vessels 10 and 23.

Figure 5:
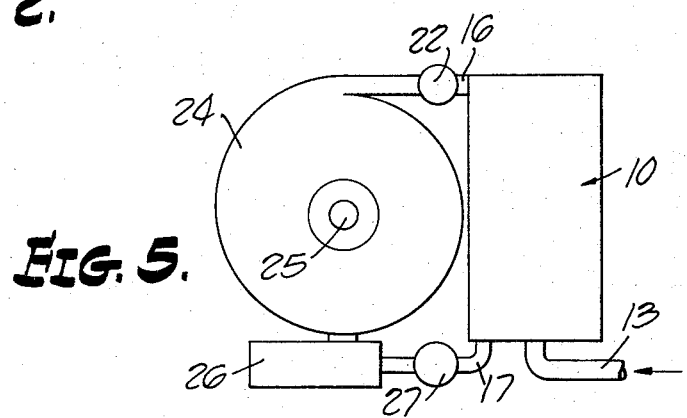

FIG. 5 is a schematic illustration of the pollutantfree combustion motor of the instant invention wherein a turbine 24 having an output shaft 25 and a fluid collecting tank 26 is shown connected to the temperature controlled valve 22 and port 16. The fluid collected in tank 26 is re-injected into the system by fluid injector 27 via inlet duct 17 into gas generator 10.

While several embodiments of a simple, highly efficient and economical gas generator has been disclosed herein, it is understood that variations may be made therein without departing from the principle of the invention or the scope of the annexed claims.

I claim:

1. A highly efficient gas generator for providing motive power to a motor, comprising
a cylindrical body, having concentric external and internal walls in radially spaced relationship, said walls being connected by top and bottom surfaces so as to form an enclosed hollow chamber;

a heatable, nonflammable working liquid having low latent heat, low specific heat, a low freezing point and a high molecular weight contained in said hollow chamber;

inlet duck means connected to said hollow chamber for providing working liquid to said hollow chamber;

outlet duct means connected to said hollow chamber for conducting superheated working liquid from said hollow chamber to a motor or the like;

a cylindrical mesh concentrically positioned radially inwardly of said body walls and laterally spaced therefrom;

a catalytic compound for producing a flameless radiant heat dispersed on said mesh over substantially the surface thereof which faces the internal wall of said hollow body so as to superheat the working liquid and maintaining the same in liquid form;

conduit means positioned adjacent said catalytic compound for conducting combustable fuel to the surface of said catalytic compound;

pressure sensor means connected to said hollow chamber for maintaining a constant pressure therein;

temperature sensor means connected to said hollow chamber for maintaining a constant temperature of said working liquid therein; and insulation means surrounding the exterior surface of the most laterally positioned external wall of said hollow chamber for preserving the heat within said hollow chamber.

2. A highly efficient gas generator for providing motive power to a motor as described in claim 1 wherein the mesh is a screen.

3. A highly efficient gas generator for providing motive power to a motor as described in claim 1 which includes tubular reflector means concentrically positioned radially inwardly of said mesh for directing stray heat rays toward said working liquid.

4. A highly efficient gas generator for providing motive power to a motor as described in claim 3 wherein said reflector means is provided with an inverted hollow conical reflective section secured at one end thereof in axial alignment with at least one end of the reflector means whereby the unsecured end of said conical section diverges outwardly from the axis of the reflector means so as to overlie the catalytic compound and the space between the internal wall of the hollow chamber and the catalytic compound.

5. A highly efficient gas generator for providing motive power to a motor as described in claim 1 wherein the inlet duct means intersects the hollow chamber at its lowermost end and the outlet duct means intersects the hollow chamber at its uppermost end.

6. A highly efficient gas generator for providing motive power to a motor as described in claim 1 wherein a second cylindrical body having concentric internal external walls in radially spaced relationship and having the walls connected by surfaces at the top and bottom so as to form an enclosed hollow chamber is positioned radially inwardly of said mesh and laterally spaced therefrom.

7. A highly efficient gas generator for providing motive power to a motor as described in claim 6 wherein a heatable nonflammable working fluid having low latent heat, low specific heat, a low freezing point and a high molecular weight is contained in said hollow chamber.

8. A highly efficient gas generator for providing motive power to a motor as described in claim 7 wherein the inlet duct means for providing the working fluid to said second hollow chamber is connected to the lowermost portion of said hollow chamber.

9. A highly efficient gas generator for providing motive power to a motor as described in claim 8, wherein the outlet duct means for conducting the superheated working fluid from the hollow chamber to a motor or the like is connected to the uppermost portion of said hollow chamber.

10. A higly efficient gas generator for providing motive power to a motor as described in claim 7 wherein said catalytic compound is dispersed on said mesh over substantially both surfaces thereof so that said catalytic compound is opposite the internal wall of the first hollow chamber and opposite the external wall of said second hollow chamber.

11. A highly efficient gas generator for providing motive power to a motor as described in claim 7 wherein insulation means surround the exterior surface of the external wall of the first hollow chamber and the exterior surface of the internal wall of the second hollow chamber.

12. A highly efficient gas generator for providing motive power to a motor as described in claim 7 wherein the pressure sensor means are connected to the second hollow chamber for maintaining a constant critical pressure therein.

13. A highly efficient gas generator for providing motive power to a motor as described in claim 7 wherein temperature sensor means are connected to the second hollow chamber for maintaining a constant critical temperature of said working fluid therein.

14. A method for generating high pressure gases within a gas generator for driving motors without producing air polluting products, comprising:

combusting a fuel over the surface of a nonflammable catalytic compound;

directing the heat rays produced by said combustion toward a nonflammable working liquid which has a low latent heat, low specific heat, a low freezing point and a high molecular weight;

raising the pressure of said working liquid above its critical pressure;

superheating said working liquid above its critical temperature and vaporizing the same;

conveying said vapor to a motor;

expanding said vapor to a desired condensing pressure so as to propel said motor;

condensing said vapor to a liquid; and repeating the cycle.

15. The method described in claim 14 wherein the working liquid contains carbon, chlorine and flourine in stable chemical combination.

16. The method described in claim 15 wherein the working liquid is tetraflour-dichloro-ethan, ($C\ ClF_2 - C\ ClF_2$).

17. The method described in claim 15 wherein the working liquid is trichlor-trifloro-ethan, ($C\ Cl_2F - C\ ClF_2$).

18. The method described in claim 14 wherein the working liquid comprises carbon, flourine, hydrogen and oxygen in stable combination.

19. The method described in claim 18 wherein the working liquid is hexaflouro-isopropanol, ( $(CF_3)_2$ CHOH).

20. The method described in claim 14 wherein the working liquid comprises halogenated hydrocarbon compounds in stable combination.

21. The method described in claim 20 wherein the working liquid is tetraflour-dibrom-ethan, (C $BrF_2$ - C $BrF_2$).

22. The method of converting heat into work, comprising:
  a thermodynamic cycle of combusting a fuel over a nonflammable catalytic compound;
  directing the heat rays produced by said combustion toward a liquid comprising carbon, chlorine and flourine in stable combination so as to superheat and vaporize said liquid; and
  expanding and liquifying said fluid.

23. The method described in claim 22 wherein the liquid is tetraflour-dichloro-ethan, (C $ClF_2$ - C $ClF_2$).

24. The method described in claim 22 wherein the liquid is trichlor-trifloro-ethan (C $Cl_2F$ - C $ClF_2$).

25. The method described in claim 22 wherein the working liquid comprises carbon, flourine, hydrogen and oxygen in stable combination.

26. The method described in claim 25 wherein the working liquid is hexaflouro-isopropanol, ( $(CF_3)_2$ CHOH).

27. The method described in claim 22 wherein the working liquid comprises halogenated hydrocarbon compounds in stable combination.

28. The method described in claim 27 wherein the working liquid is tetraflour-dibrom-ethan (C $BrF_2$ - C $BrF_2$).

* * * * *